US012742976B2

(12) United States Patent
Bai et al.

(10) Patent No.: US 12,742,976 B2
(45) Date of Patent: Sep. 22, 2026

(54) LENS ASSEMBLY, DISPLAY MODULE, AND ELECTRONIC DEVICE

(71) Applicant: Beijing Zitiao Network Technology Co., Ltd., Beijing (CN)

(72) Inventors: Wenbin Bai, Beijing (CN); Ziyang Zhang, Los Angeles, CA (US); Shaopeng Zhu, Beijing (CN); Xin Li, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 253 days.

(21) Appl. No.: 18/763,371

(22) Filed: Jul. 3, 2024

(65) Prior Publication Data

US 2025/0013062 A1 Jan. 9, 2025

(30) Foreign Application Priority Data

Jul. 7, 2023 (CN) ........................ 202310835423.4

(51) Int. Cl.
*G02B 27/28* (2006.01)
*G02B 1/08* (2006.01)
(Continued)

(52) U.S. Cl.
CPC ............. *G02B 27/288* (2013.01); *G02B 1/08* (2013.01); *G02B 27/0172* (2013.01); *G02B 27/0955* (2013.01)

(58) Field of Classification Search
CPC .... G02B 27/288; G02B 1/08; G02B 27/0172; G02B 27/0955; G02B 3/00; G02B 1/00;
(Continued)

(56) References Cited

U.S. PATENT DOCUMENTS 11,397,329 B2 * 7/2022 Jamali ................ G02B 27/0955
2018/0239146 A1 * 8/2018 Bierhuizen ........ G02B 17/0856
(Continued)

FOREIGN PATENT DOCUMENTS

CN 208126018 U 11/2018
CN 110161699 A 8/2019
(Continued)

OTHER PUBLICATIONS

Office action received from Chinese patent application No. 202310835423.4 mailed on Aug. 29, 2025, 12 pages (6 pages English Translation and 6 pages Original Copy).

*Primary Examiner* — Mariam Qureshi

(57) ABSTRACT

The present application discloses a lens assembly, a display module, and an electronic device. The lens assembly includes a first lens including a first surface and an opposite second surface and a semi-transmissive and semi-reflective film arranged on the first surface. The semi-transmissive and semi-reflective film includes a modulation film layer and a medium film layer, the modulation film layer being arranged on the first surface of the first lens, and the medium film layer being arranged on a side of the modulation film layer away from the first lens. The medium film layer and the modulation film layer are configured to cooperatively adjust a refractive index of the semi-transmissive and semi-reflective film, so as to allow circularly polarized light incident on the semi-transmissive and semi-reflective film at different incident angles to remain as the circularly polarized light after entering the first lens.

20 Claims, 5 Drawing Sheets

(51) Int. Cl.
*G02B 27/01* (2006.01)
*G02B 27/09* (2006.01)

(58) Field of Classification Search
CPC ........ G02B 1/10; G02B 5/30; G02B 27/0101; G02B 27/10; G02B 27/123
See application file for complete search history.

(56) References Cited

U.S. PATENT DOCUMENTS

| | | | | |
|---|---|---|---|---|
| 2019/0377176 | A1 | 12/2019 | Sharp | |
| 2019/0384070 | A1* | 12/2019 | Geng | G02B 27/28 |
| 2023/0333405 | A1 | 10/2023 | Yamada | |
| 2023/0341697 | A1* | 10/2023 | Chen | G02B 27/28 |
| 2023/0359033 | A1 | 11/2023 | Iba | |
| 2024/0176116 | A1* | 5/2024 | Chen | G06F 1/163 |
| 2024/0241405 | A1 | 7/2024 | Huang | |
| 2024/0288692 | A1* | 8/2024 | Chen | G02B 27/0172 |

FOREIGN PATENT DOCUMENTS

| | | | |
|---|---|---|---|
| CN | 112543880 | A | 3/2021 |
| CN | 114911059 | A | 8/2022 |
| CN | 217279117 | U | 8/2022 |
| CN | 116224578 | A | 6/2023 |
| JP | 2022-041791 | A | 3/2022 |
| WO | 2022/038777 | A1 | 2/2022 |
| WO | 2022/138157 | A1 | 6/2022 |

* cited by examiner

LENS ASSEMBLY, DISPLAY MODULE, AND ELECTRONIC DEVICE

CROSS REFERENCE TO RELATED APPLICATION

This application claims priority from Chinese Patent Application No. 202310835423.4, filed on Jul. 7, 2023, the contents of which are hereby incorporated by reference in their entirety for all purposes.

TECHNICAL FIELD

The present application relates to the field of display technologies, and in particular to a lens assembly, a display module, and an electronic device.

BACKGROUND ART

In the related art, an ultra-short-throw folded-optical-path (Pancake) solution has gradually become the direction of development and evolution of consumer virtual reality optics thanks to its significant advantages of relatively small angle of view, and light weight and portability of a device. In a virtual reality device based on the Pancake optical solution, after an image source enters a beam splitter, light travels back and forth many times between lenses of a lens group, and finally exits the lenses and enters human eyes.

SUMMARY OF THE INVENTION

Implementations of the present application provide a lens assembly, a display module, and an electronic device.

The lens assembly provided in an implementation of the present application includes a first lens and a semi-transmissive and semi-reflective film. The first lens includes a first surface and an opposite second surface, and the semi-transmissive and semi-reflective film is arranged on the first surface of the first lens. The semi-transmissive and semi-reflective film includes a modulation film layer and a medium film layer, the modulation film layer being arranged on the first surface of the first lens, and the medium film layer being arranged on a side of the modulation film layer away from the first lens. The medium film layer and the modulation film layer are configured to cooperatively adjust a refractive index of the semi-transmissive and semi-reflective film, so as to allow circularly polarized light incident on the semi-transmissive and semi-reflective film at different incident angles to remain as the circularly polarized light after entering the first lens.

In some implementations, the medium film layer and the modulation film layer are configured to control a difference between a refractive index for a P-polarized state and a refractive index for a S-polarized state of the circularly polarized light transmitted and reflected by the semi-transmissive and semi-reflective film, so as to make a difference between the amounts of split light in the P-polarized state and the S-polarized state of the circularly polarized light entering the semi-transmissive and semi-reflective film less than a preset threshold.

In some implementations, the modulation film layer includes a plurality of columnar modulation units arranged side by side on the first surface of the first lens, a major axis of each of the modulation units inclines at an angle relative to an optical axis of the first lens.

In some implementations, an intersection point between the major axis of the modulation unit and the first surface of the first lens acts as an incident point, there is an included angle between a normal of the first surface of the first lens at the incident point and the major axis of the modulation unit, and the included angle is associated with a radius of curvature of the first lens, an on-axis distance between the incident point and the optical axis of the first lens, a distance between a light source that emits the circularly polarized light and the first surface of the first lens on the optical axis of the first lens, and a maximum length over which the light source is capable of emitting the circularly polarized light in a direction perpendicular to the optical axis of the first lens.

In some implementations, the included angle has a value in a range from 5° to 80°.

In some implementations, the medium film layer has a thickness in a range from 20 nm to 2000 nm.

In some implementations, the modulation film layer has a thickness in a range from 20 nm to 2000 nm.

In some implementations, the medium film layer is made of an oxide material.

In some implementations, the modulation film layer is made of an oxide material or a metal material.

In some implementations, the modulation film layer is made of a metal material, and the modulation film layer has a thickness in a range from 50 nm to 2000 nm.

In some implementations, the lens assembly further includes a phase retardation film arranged on the second surface of the first lens, the phase retardation film being configured to change a polarized state of light passing through the phase retardation film.

In some implementations, the lens assembly further includes a second lens and a reflective polarizing film, the second lens including a first surface and an opposite second surface, and the first surface of the second lens facing the second surface of the first lens. The reflective polarizing film is arranged on the first surface of the second lens and is configured to reflect linearly polarized light in the P-polarized state from the phase retardation film toward the phase retardation film and to transmit linearly polarized light in the S-polarized state from the phase retardation film.

A display module provided in an implementation of the present application includes a lens assembly of any of the above implementations and a display screen configured to emit light to the lens assembly.

An electronic device provided in an implementation of the present application includes a body and a display module of the above implementation, the display module being integrated with the body.

Additional aspects and advantages of the present application will be set forth in part in the following description, and in part will be apparent from the following description, or may be learned by practice of the present application.

BRIEF DESCRIPTION OF THE DRAWINGS

The above and/or additional aspects and advantages of the present application will become apparent and easy to understand from the following description of implementations with reference to the accompanying drawings, in which.

DETAILED DESCRIPTION

Figure 1:
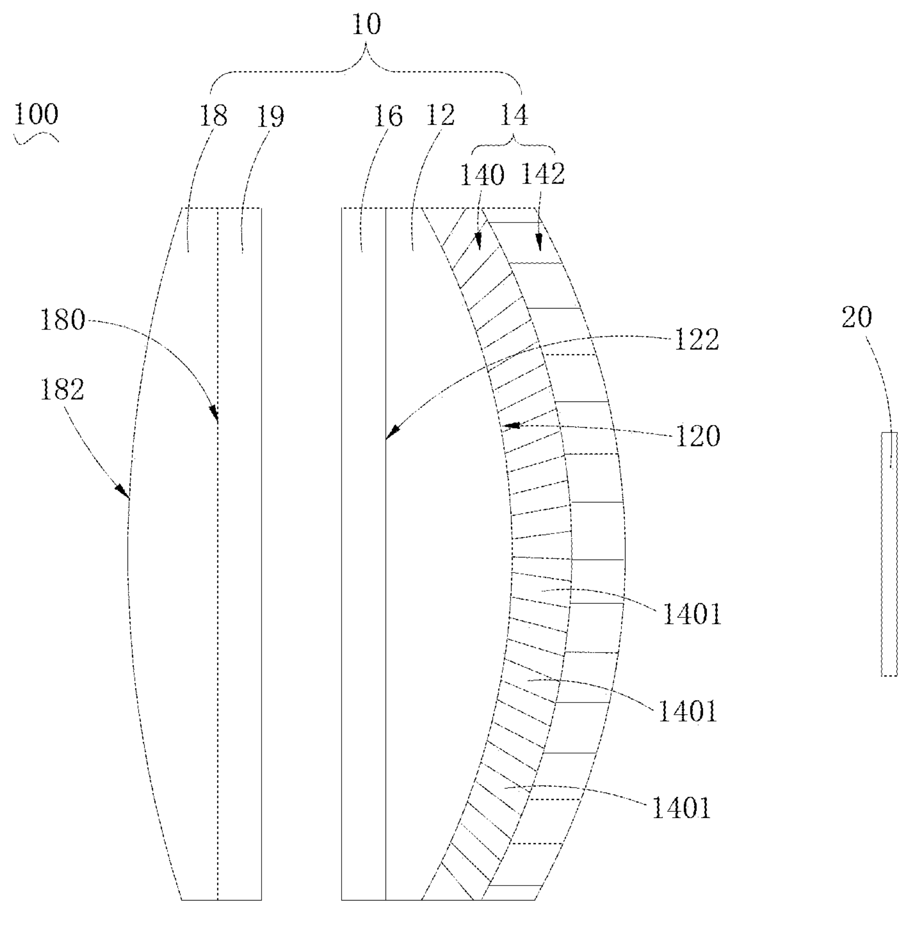
FIG. 1 is a schematic diagram of a structure of a display module according to of the present some implementations application.

Implementations of the present application will be described in detail below. Examples of the implementations are shown in the accompanying drawings, and throughout the drawings, the same or similar reference signs refer to the same or similar elements or elements having the same or similar functions. The implementations described below with reference to the accompanying drawings are exemplary and are merely intended to be illustrative of the implementations of the present application, but should not be construed as limiting the implementations of the present application.

The following disclosure provides many different implementations or examples to implement different structures of the implementations of the present application. In order to simplify the disclosure of the implementations of the present application, components and arrangements of specific examples are described below. Of course, they are only examples and are not intended to limit the present application. In the implementations of the present application, reference numerals and/or reference letters may be repeated in different examples, and this repetition is for the purpose of simplicity and clarity, and does not in itself indicate the relationship between the various implementations and/or arrangements discussed. In addition, the implementations of the present application provide examples of various specific processes and materials, but those of ordinary skill in the art can realize the application of other processes and/or the use of other materials.

In a virtual reality device based on an ultra-short-throw folded-optical-path (Pancake) optical solution, after an image source enters a beam splitter, light travels back and forth many times between lenses of a lens group, and finally exits the lenses and enters human eyes.

In an optical path of the lens group, "useful" light refers to light for imaging that effectively follows a complete folded optical path according to a lens design, "unwanted" light refers to light that does not follow the complete folded optical path but reaches human eyes, and the "unwanted" light does not contribute to imaging and acts as stray light to reduce contrast and as ghosting to interfere with a person's vision. A degree of circular polarization of circularly polarized light in the optical path is an important indicator to ensure a proportion of the "useful" light. Specifically, a lower degree of circular polarization of the circularly polarized light in the optical path means a lower proportion of the "useful" light, and on contrast, a higher degree of circular polarization of the circularly polarized light in the optical path means a higher proportion of the "useful" light.

The degree of circular polarization may be defined as a degree to which the circularly polarized light at an exit side remains as it is after a transmission of the circularly polarized light. When incident light is the circularly polarized light, emergent light may have the circularly polarized light, elliptically polarized light, or both. Less circularly polarized light and more elliptically polarized light being included by the emergent light indicates that the degree of circular polarization of the circularly polarized light is low. More circularly polarized light and less elliptically polarized light being included by the emergent light indicates that the degree of circular polarization of the circularly polarized light is high.

Figure 6:
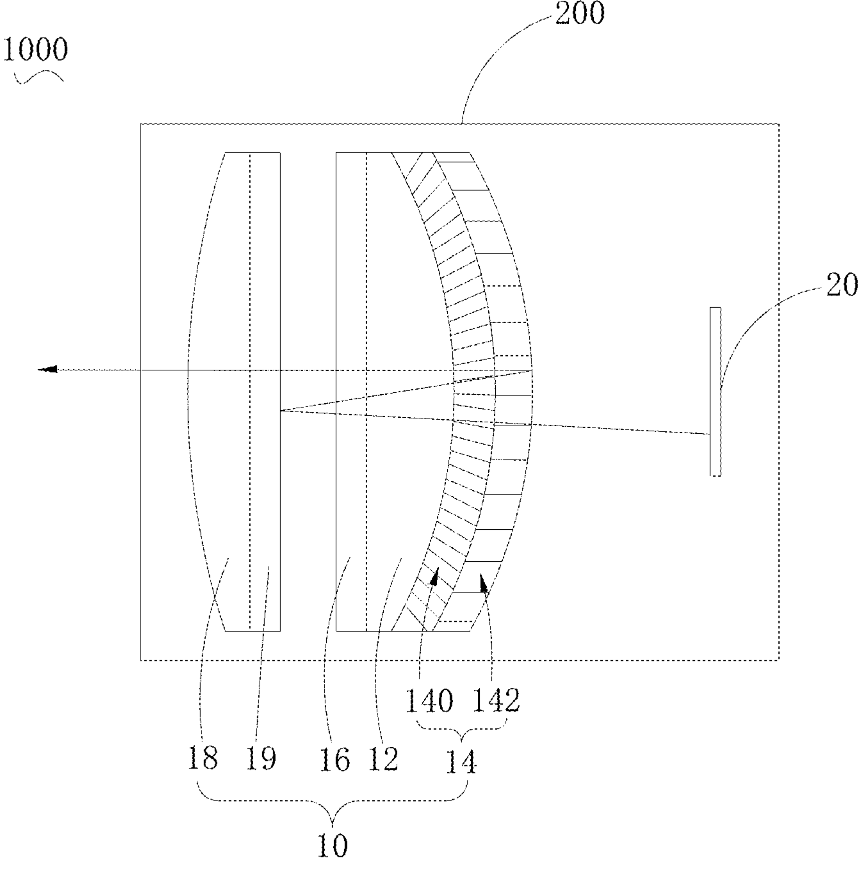
FIG. 6 is a schematic diagram of a structure of an electronic device according to some implementations of the present application.
Figure 7:
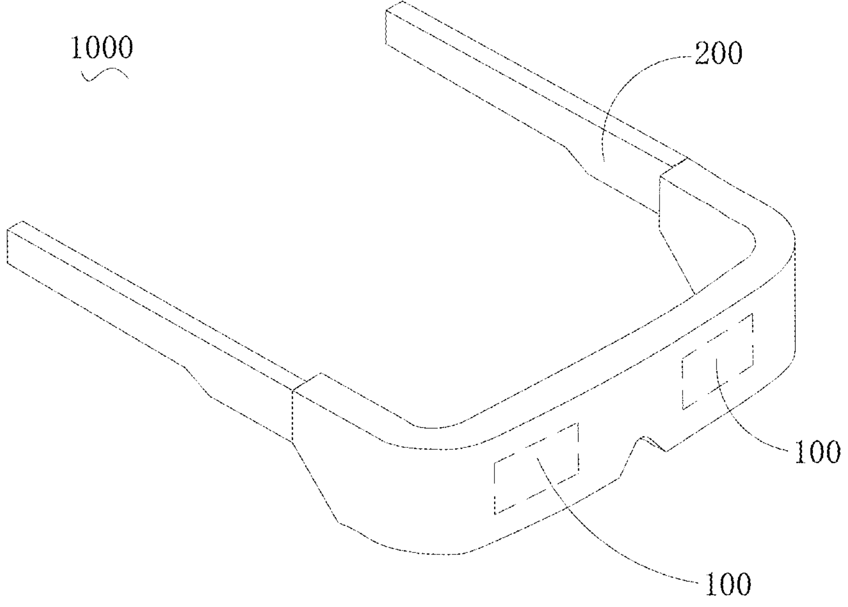
FIG. 7 is a schematic perspective view of a structure of an electronic device according to some implementations of the present application.

In the Pancake-based optical solution, a beam splitter, a phase retarder and a reflective polarizing film are mainly included. Right circularly polarized (RCP) light is emitted by a light source, and after passing through the beam splitter, 50% of the light is reflected, and 50% of the light is transmitted through the beam splitter. The transmitted right circularly polarized light passes through the phase retarder and is then converted into P-linearly polarized light, and the P-linearly polarized light reaches the reflective polarizing film and is reflected by the reflective polarizing film. The P-linearly polarized light passes through the phase retarder for the second time and is then converted back into the right circularly polarized light, and the right circularly polarized light is reflected by the beam splitter and is converted into left circularly polarized (LCP) light. The left circularly polarized light passes through the phase retarder for the third time and is converted into S-linearly polarized light, and the S-linearly polarized light reaches and is transmitted through the reflective polarizing film, and finally enters the human eyes. In this process, the phase retarder is configured to convert polarized states of light. In order to ensure that the circularly polarized light transmitted through the phase retarder can be converted into the linearly polarized light, it is necessary to ensure that all the light emitted to the phase retarder is the circularly polarized light. However, when the circularly polarized light is transmitted through the beam splitter, due to a small distance between the light source and the beam splitter and the small size of the light source, light is incident on the beam splitter at a large incident angle. In this case, the circularly polarized light transmitted through the beam splitter is converted into the elliptically polarized light, and after passing through the phase retarder, the elliptically polarized light cannot be converted into the linearly polarized light, and consequently cannot be reflected by the reflective polarizing film and becomes stray light propagating in the optical path. The stray light gathers in the optical path between the lenses, which produces shadows and ultimately causes ghosting in a user's view, resulting in a poor imaging effect. In order to solve the problem, the present application provides a lens assembly 10 (as shown in FIG. 1), a display unit 100 (as shown in FIG. 6), and an electronic device (as shown in FIG. 7).

Referring to FIG. 1, the lens assembly 10 provided in an implementation of the present application includes a first lens 12 and a semi-transmissive and semi-reflective film 14.

The first lens 12 includes a first surface 120 and an opposite second surface 122, and the semi-transmissive and semi-reflective film 14 includes a modulation film layer 140 and a medium film layer 142. The modulation film layer 140 is arranged on the first surface 120 of the first lens 12, and the medium film layer 142 is arranged on a side of the modulation film layer 140 away from the first lens 12. The medium film layer 142 and the modulation film layer 140 are configured to cooperatively adjust a refractive index of the semi-transmissive and semi-reflective film 14, so as to allow the circularly polarized light incident on the semi-transmissive and semi-reflective film 14 at different incident angles to remain as the circularly polarized light after entering the first lens 12.

The first lens 12 is an optical element made of a light-transmitting material (such as glass, plastic or crystal), and transmits light in the optical path of the lens assembly 10 mainly by virtue of the refraction of light. The first lens 12 includes the first surface 120 and the opposite second surface 122.

The semi-transmissive and semi-reflective film 14 is configured to transmit the circularly polarized light incident therein, and can reflect the circularly polarized light from the second surface 122 of the first lens 12 into circularly polarized light with an opposite rotation direction.

The semi-transmissive and semi-reflective film 14 is arranged on the first surface 120 of the first lens 12. The semi-transmissive and semi-reflective film 14 includes the modulation film layer 140 and the medium film layer 142. The semi-transmissive and semi-reflective film 14 is in the form of a stack of the modulation film layer 140 and the medium film layer 142, and refractive indices of the modulation film layer 140 and the medium film layer 142 can be controlled to be different. By adjusting the refractive indices and thicknesses of the modulation film layer 140 and the medium film layer 142, the light splitting effect of the semi-transmissive and semi-reflective film 14 can be changed, that is, the degree of circular polarization of the circularly polarized light after transmission can be increased.

In the lens assembly 10, the modulation film layer 140 and the medium film layer 142 are configured to cooperatively adjust the refractive index of the semi-transmissive and semi-reflective film 14 to allow more uniform light splitting for a P-polarized state and an S-polarized state of the circularly polarized light, so as to allow the circularly polarized light passing through the semi-transmissive and semi-reflective film 14 to remain in a circularly polarized state, and enable a higher degree of circular polarization of the transmitted circularly polarized light, such that the influences of stray light on the subsequent propagation of light in the optical path are reduced, thereby reducing the ghosting and improving the imaging effect.

In some implementations, the medium film layer 142 and the modulation film layer 140 are configured to control a difference between a refractive: index for the P-polarized state and a refractive index for the S-polarized state of the circularly polarized light transmitted and reflected by the semi-transmissive and semi-reflective film 14, so as to make a difference between the amounts of split light in the P-polarized state and the S-polarized state of the circularly polarized light entering the semi-transmissive and semi-reflective film less than a preset threshold.

In this way, by controlling the difference between the refractive index for the P-polarized state and the refractive index for the S-polarized state of the circularly polarized light, the degree of circular polarization of the circularly polarized light can be higher.

Specifically, the degree of circular polarization of the circularly polarized light is associated with the difference between the refractive index for the P-polarized state and the refractive index for the S-polarized state of the circularly polarized light. The medium film layer 142 and the modulation film layer 140 can make the difference between the amounts of split light in the P-polarized state and the S-polarized state of the circularly polarized light entering them less than the preset threshold. In a state in which the amounts of split light in the P-polarized state and the S-polarized state are equal, the degree of circular polarization of the circularly polarized light can be optimal. Then, the preset threshold can make the amounts of split light in the P-polarized state and the S-polarized state close to this state. That is, the preset threshold can make the amounts of split light in the P-polarized state and the S-polarized state approximately equal. The preset threshold can be a rational range based on experiments or experiences, and is not specifically limited here.

Figure 2:
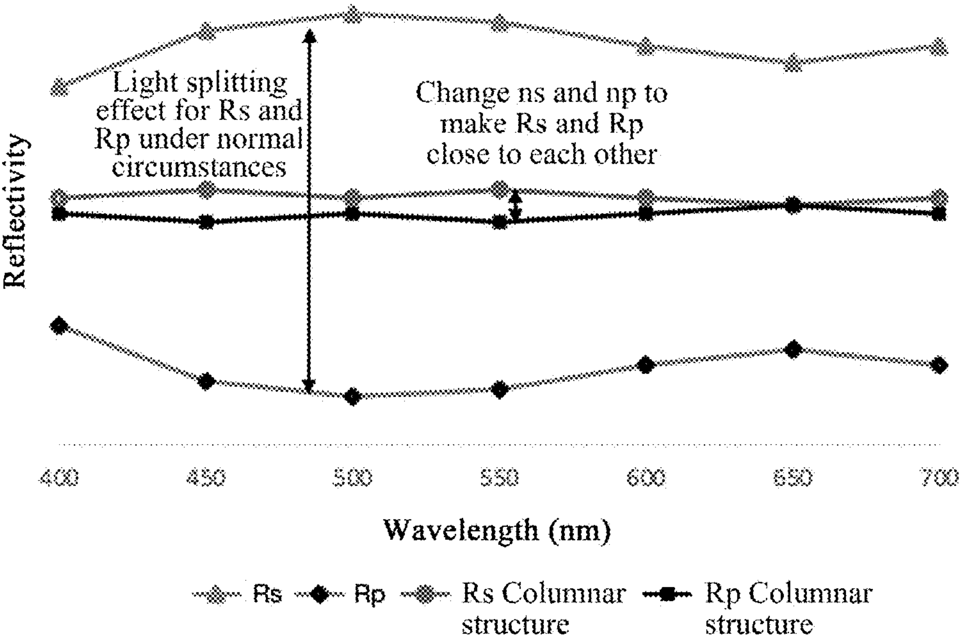
FIG. 2 is a schematic diagram of a reflectivity of a lens assembly in the display module shown in FIG. 1 as function of a wavelength of light.

Referring to FIG. 2, FIG. 2 is a schematic diagram of a reflectivity of the semi-transmissive and semi-reflective film 14 for the circularly polarized light as function of a wavelength of light. In the semi-transmissive and semi-reflective film 14, by adjusting the difference between the refractive index for the P-polarized state and the refractive index for the S-polarized state of the circularly polarized light, the amounts of split light in the P-polarized state and the S-polarized state are more uniform. The preset threshold is s reflected as a distance between a reflectivity $R_S$ and a reflectivity $R_P$ in FIG. 2. The smaller the distance, the higher the degree of circular polarization of the circularly polarized light after passing through the semi-transmissive and semi-reflective film 14.

Figure 3:
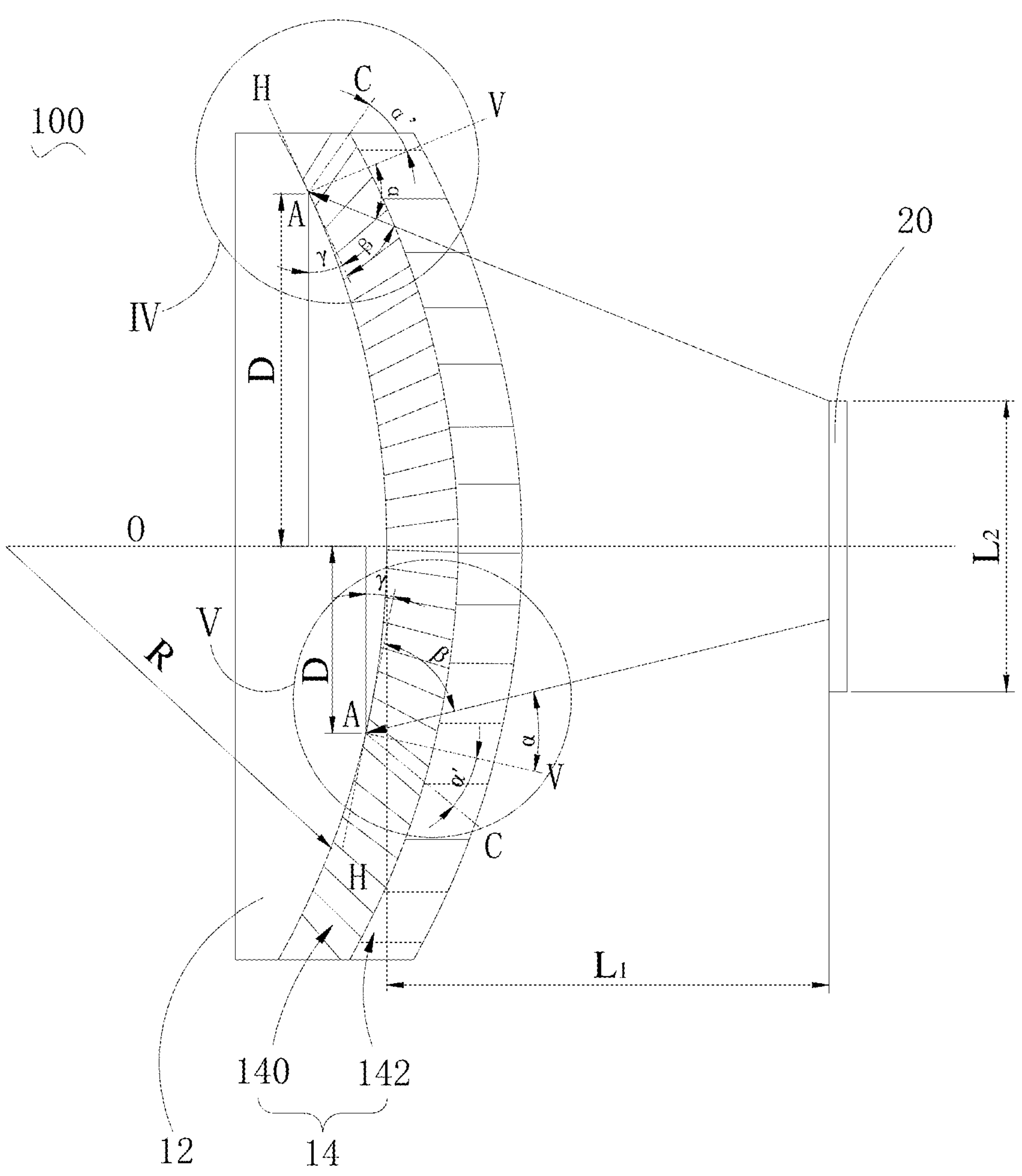
FIG. 3 is a schematic diagram of a partial structure of the display module shown in FIG. 1.

Specifically, referring to FIGS. 1 and 3, in some implementations, the modulation film layer 140 includes a plurality of columnar modulation units 1401, the plurality of columnar modulation units 1401 being arranged side by side on the first surface 120 of the first lens 12, and a major axis of each of the modulation units 1401 inclines at an angle relative to an optical axis O of the first lens 12.

In this way, in the semi-transmissive and semi-reflective film 14, the refractive index of the modulation film layer 140 is changed by means of an angle at which the major axis of each modulation unit 1401 inclines relative to the optical axis O of the first lens 12, and the modulation film layer cooperates with the medium film layer 142 to remain the polarized state of a transmitted portion of the incident light.

Specifically, as shown in FIG. 3, the optical axis of the first lens 12 is denoted by O, the major axis of the modulation unit 1401 is denoted by C, and the major axis C of the modulation unit 1401 is at an angle relative to the optical axis O, such that the refractive index of the modulation film layer 140 can be changed to create a different refractive angle than the refractive index of the medium film layer 142, thereby allowing the circularly polarized light incident on the semi-transmissive and semi-reflective film 14 at different incident angles to remain as the circularly polarized light after entering the first lens 12.

In some implementations, an intersection point between the major axis of the modulation unit 1401 and the first surface 120 of the first lens 12 acts as an incident point, there is an included angle between a normal of the first surface 120 of the first lens 12 at the incident point and the major axis of the modulation unit 1401, and the included angle is associated with a radius of curvature of the first lens 12, an on-axis distance between the incident point and the optical axis O of the first lens 12, a distance between the light source that emits the circularly polarized light and the first surface 120 of the first lens 12 on the optical axis O of the first lens 12, and a maximum length over which the light source can emit the circularly polarized light in a direction perpendicular to the optical axis O of the first lens 12.

In this way, in the lens assembly 10, as shown in FIG. 3, a section is made in a lens surface direction of the first lens 12, and a positional relationship between the lens assembly 10 and the light source is equivalently represented as a geometric relationship in a plane. Via the included angle and the radius of curvature of the first lens 12, the on-axis distance between the incident point and the optical axis O of the first lens 12, the distance between the light source that emits the circularly polarized light and the first surface 120 of the first lens 12 on the optical axis O of the first lens 12, and the maximum length over which the light source can emit the circularly polarized light in the direction perpendicular to the optical axis O of the first lens 12, an angle between the major axis of the modulation unit 1401 and the optical axis O of the first lens 12 can be calculated and determined.

Figure 4:
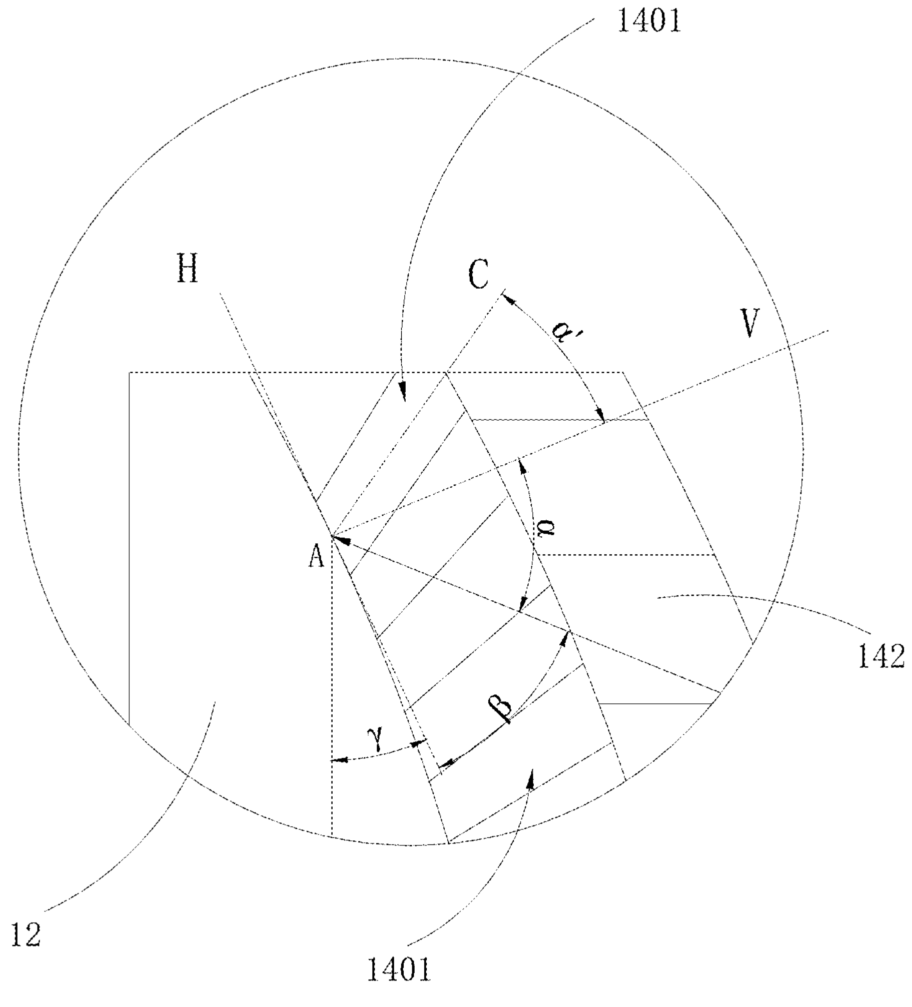
FIG. 4 is an enlarged schematic diagram of part IV of FIG. 3.
Figure 5:
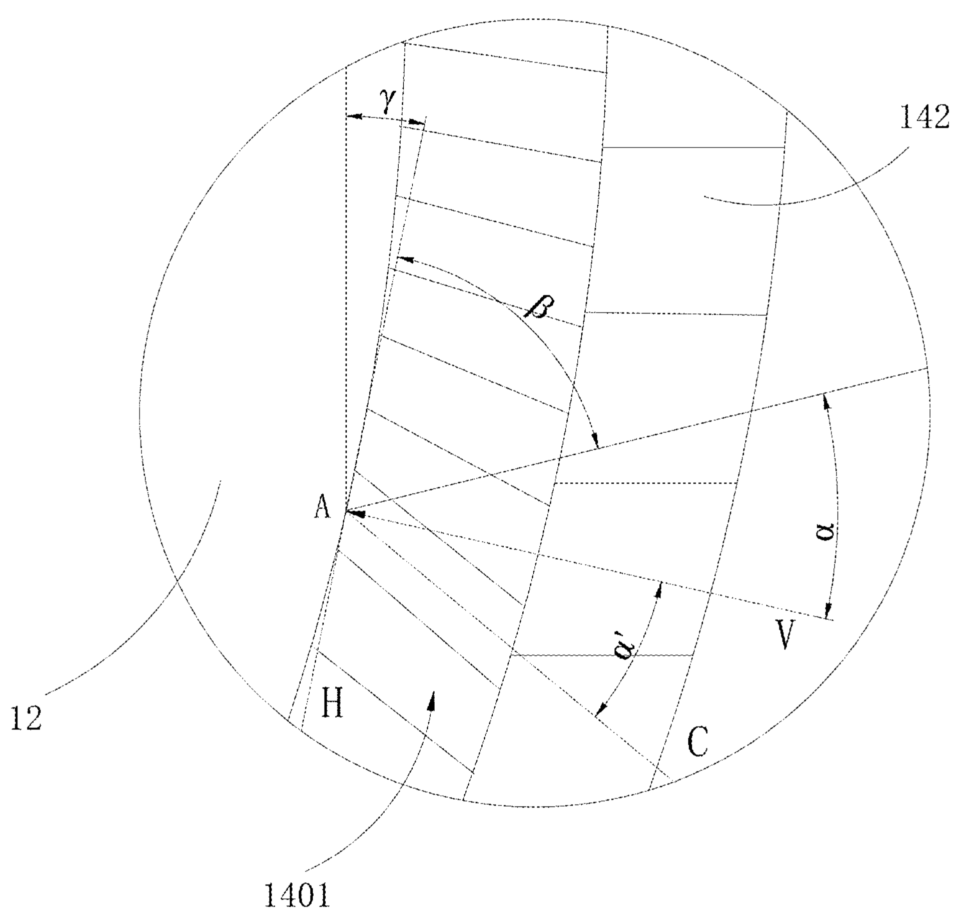
FIG. 5 is an enlarged schematic diagram of part V of FIG. 3.

Specifically, as shown in FIGS. 3 to 5, the radius of curvature of the first lens 12 is denoted by R, the major axis of the modulation unit 1401 is denoted by C, the incident point is denoted by A, a tangent of the first surface 120 of the first lens 12 passing through the incident point A is denoted by H, the normal of the first surface 120 of the first lens 12 passing through the incident point is denoted by V, the distance between the light source that emits the circularly polarized light and the first surface 120 of the first lens 12 on the optical axis O of the first lens 12 is denoted by $L_1$, the maximum length over which the light source can emit the circularly polarized light in the direction perpendicular to the optical axis O of the first lens 12 is denoted by $L_2$, and a perpendicular line from the incident point A to the optical axis O is denoted by D, which represents the on-axis distance between the incident point A and the optical axis O of the first lens 12, where $2D=L_3$. The incident angle of the incident light is denoted by $\angle\alpha$, the included angle between the major axis C of the modulation unit 1401 and the normal V of the first surface 120 of the first lens 12 is denoted by $\angle\alpha'$, a complementary angle of $\angle\alpha$ is denoted by $\angle\beta$, and the included angle between D and H is denoted by $\angle\gamma$. Depending on the different positions of the incident point A on the first surface 120 of the first lens 12, the value of $\angle\alpha$ varies, as shown in FIGS. 4 and 5. When the incident circularly polarized light is incident close to the optical axis O of the first lens 12, the degree of circular polarization of the circularly polarized light passing through the semi-transmissive and semi-reflective film 14 is then be higher, even if the refractive index of the modulation film layer 140 is the same as that of the medium film layer 142. Therefore, in a direction closer to the optical axis O of the first lens 12, the incident angle of the circularly polarized light is smaller, that is, the value of $\angle\alpha'$ is smaller. Accordingly, in a direction farther away from the optical axis O of the first lens 12, the incident angle of the circularly polarized light is larger, that is, the value of $\angle\alpha'$ is larger.

$\angle\alpha'$ is equal to a reflection angle of the incident light, so $\angle\alpha=\angle\alpha'$, and $\angle\beta$ is the complementary angle of $\angle\alpha$, so $\angle\beta=90°-\angle\alpha$.

Based on the above relationship, the following geometric calculation is carried out:

$$\angle\beta = \tan^{-1}\left(\frac{2L_1}{L_3 - L_2}\right)$$

$$\angle\gamma = \sin^{-1}\left(\frac{2D}{L_3}\right)$$

$$\angle\alpha = \frac{\pi}{2} - (\angle\beta - \angle\gamma) = \frac{\pi}{2} - \tan^{-1}\left(\frac{2L_1}{L_3 - L_2}\right) + \sin^{-1}\left(\frac{L_3}{2R}\right)$$

It can be seen from the above geometric derivation that knowing the distance $L_1$ between the light source that emits the circularly polarized light and the first surface 120 of the first lens 12 on the optical axis O of the first lens 12, the maximum length $L_2$ over which the light source can emit the circularly polarized light in the direction perpendicular to the optical axis O of the first lens 12, the on-axis distance D between the incident point A and the optical axis O of the first lens 12, and the radius of curvature R of the first lens 12, the included angle $\angle\alpha'$ between the major axis C of the modulation unit 1401 and the normal V of the first surface can be obtained. By coating the first lens 12 according to $\angle\alpha'$, the modulation film layer 140 with a corresponding angle between the major axis C of the modulation unit 1401 and the normal V of the first surface 120 of the first lens 12 can be obtained, so as to cooperate with the medium film layer 142 to adjust the light splitting effect of the semi-transmissive and semi-reflective film 14.

In some implementations, the included angle has a value in a range from 5° to 80°.

In this way, this range makes it possible to achieve a smaller size of the lens assembly 10 while remaining a better effect of the semi-transmissive and semi-reflective film 14.

Specifically, when the lens assembly 10 is used in a display device 1000 (as shown in FIG. 6 or FIG. 7), there are certain restrictions on the relevant dimensions of the lens assembly 10 according to the size requirements of the lens assembly 10. Therefore, according to the comprehensive consideration of the above-mentioned method for calculating the included angle and the size requirements of the lens assembly 10, the included angle has a value in a range from 5° to 80°, and the value of the included angle gradually increases from a direction close to the optical axis O to a direction away from the optical axis O. In this way, it is possible to achieve a smaller size of the lens assembly 10 while providing a good imaging effect. When the included angle $\angle\alpha'$ is less than 5°, or when the included angle $\angle\alpha'$ is greater than 80°, the imaging effect of the lens assembly 10 may meet the requirements but the lens assembly 10 has a larger size, or the lens assembly 10 has a smaller size but the imaging effect of the lens assembly 10 deteriorates. Therefore, the included angle has a value in a range from 5° to 80°, for example, the value of the included angle may be 5°, 10°, 20°, 30°, 40°, 45°, 50°, 60°, 70° or 80°, or any other value in the range from 5° to 80°.

In some implementations, the medium film layer 142 has a thickness in a range from 20 nm to 2000 nm.

In some implementations, the modulation film layer 140 has a thickness in a range from 20 nm to 2000 nm.

In this way, by selecting the thicknesses of the medium film layer 142 and the modulation film layer 140 within the ranges, the characteristics of the semi-transmissive and semi-reflective film 14 can be ensured, and the overall size of the lens assembly 10 can be controlled.

Specifically, the material characteristics and thicknesses of the medium film layer 142 and the modulation film layer 140 affect the reflectivity thereof, which in turn affects the performance of the semi-transmissive and semi-reflective film 14. When the incident circularly polarized light is incident on a film surface, there is a difference in refractive angle between the medium film layer 142 and the modulation film layer 140, and by controlling the difference in refractive angle, the light splitting characteristics for the P-polarized state and the S-polarized state of the circularly polarized light can be controlled to allow more uniform light splitting for the P-polarized state and the S-polarized state of the circularly polarized light.

The modulation film layer 140 has a thickness in a range from 20 nm to 2000 nm, and for example, the thickness of the modulation film layer 140 may be 20 nm, 50 nm, 100 nm, 300 nm, 500 nm, 1000 nm, 1200 nm, 1500 nm, 1800 nm or 2000 nm, or any other value in the range from 20 nm to 2000 nm. If the modulation film layer 140 has a thickness of less than 20 nm, the processing has a high difficulty, and it is possible that the modulation unit 1401 of the modulation film layer 140 cannot be formed, or the refractive index of the modulation film layer 140 may be affected due to the too small thickness. If the modulation film layer 140 has a thickness of greater than 2000 nm, the refractive index of the modulation film layer 140 and the overall thickness of the first lens 12 may be affected.

The medium film layer 142 has a thickness in a range from 20 nm to 2000 nm, and for example, the thickness of the medium film layer 142 may be 20 nm, 50 nm, 100 nm, 300 nm, 500 nm, 1000 nm, 1200 nm, 1500 nm, 1800 nm or 2000 nm, or any other value in the range from 20 nm to 2000 nm. If the medium film layer 142 has a thickness of less than 20 nm, the processing has a high difficulty, and it is possible that the modulation unit 1401 of the modulation film layer 140 cannot be formed, or the refractive index of the medium film layer 142 may be affected due to the too small thickness. If the medium film layer 142 has a thickness of greater than 2000 nm, the refractive index of the medium film layer 142 and the overall thickness of the first lens 12 may be affected.

In some implementations, the medium film layer 142 is made of an oxide material.

In some implementations, the modulation film layer 140 is made of an oxide material or a metal material.

In this way, by means of the material characteristics of the medium film layer 142 and the modulation film layer 140, the semi-transmissive and semi-reflective effect on the incident light is achieved.

Specifically, the semi-transmissive and semi-reflective film 14 is generally disposed on the first surface 120 of the first lens 12 by means of a coating process. Among film coating materials, according to the refractive index of the coating material, the requirements of the processing process for the material, etc., the oxide material or the metal material that can realize the function of the semi-transmissive and semi-reflective film 14 is selected as the material of the medium film layer 142 and the modulation film layer 140.

The medium film layer 142 is made of the oxide material, and the modulation film layer 140 may be made of the oxide material or the metal material. When the medium film layer 142 and the modulation film layer 140 are both made of the oxide material, after processing, the medium film layer 142 and the modulation film layer 140 that are made of the oxide material can be more tightly bound with the first lens 12 and are less prone to peeling off. The oxide may be any of Al2O3, Bi2O3, CeO2, Cr2O3, HfO2, In2O3, MgO, MoO3, La2O3, Nd2O3, PbO, SiO2, Sm2O3, SnO2, Ta2O5, TiO2, Ti4O7, Ti3O5, Ti2O3, TiO, WO3, Y2O3, ZrO2 or ZnO.

In other implementations, the modulation film layer 140 can be made of the metal material, which may be any of Ag, Au or Al.

In some implementations, the modulation film layer 140 is made of the metal material, and the modulation film layer 140 has a thickness in a range from 50 nm to 2000 nm.

In this way, the metal material selected for the modulation film layer 140 cooperates with the oxide material of the medium film layer 142 to control the difference in refractive index, such that the light splitting effect of the semi-transmissive and semi-reflective film 14 can be better controlled.

Specifically, the metal material can be selected as the material of the modulation film layer 140, and the difference in refractive index between the metal material and the oxide material is greater. The metal material selected as the material of the modulation film layer 140 can better cooperate with the oxide material of the medium film layer 142 to regulate the difference in refractive index therebetween. The modulation film layer 140 has a thickness in a range from 50 nm to 2000 nm, and for example, the thickness of the modulation film layer 140 may be 50 nm, 100 nm, 150 nm, 300 nm, 500 nm, 1000 nm, 1200 nm, 1500 nm, 1800 nm or 2000 nm, or any other value in the range from 50 nm to 2000 nm. If the modulation film layer 140 has a thickness of less than 50 nm, the processing has a high difficulty, and it is possible that the modulation film layer 140 cannot be formed. If the modulation film layer 140 has a thickness of greater than 2000 nm, the refractive index of the modulation film layer 140 and the overall thickness of the first lens 12 may be affected.

In some implementations, the lens assembly 10 further includes a phase retardation layer 16, the phase retardation layer 16 being arranged on the second surface 122 of the first lens 12, and the phase retardation layer 16 being configured to change the polarized state of light passing through the phase retardation layer 16.

In this way, it is possible for the passed light to convert between the circularly polarized light and the linearly polarized light.

Specifically, the phase retardation layer 16 refers to a means capable of converting the polarized states of light. The phase retardation layer 16 enables a relative phase retardation between two polarization components of polarized light with vibration directions perpendicular to each other, thereby changing polarization characteristics of light.

The phase retardation layer 16 is arranged on the second surface 122 of the first lens 12. The phase retardation layer 16 is configured to change the polarized state of light in the folded optical path, and for example, the phase retardation layer can convert the linearly polarized light into the circularly polarized light or the circularly polarized light into the linearly polarized light.

In an implementation shown in FIG. 1, the phase retardation layer 16 is a phase retardation film arranged on the second surface 122 of the first lens 12. In other implementations, the phase retardation layer 16 may be a quarter-wave plate, which is arranged at a side close to the second surface 122 of the first lens 12.

In some implementations, the lens assembly 10 further includes a second lens 18 and a reflective polarizing film 19.

The second lens 18 includes a first surface 180 and an opposite second surface 182. The first surface 180 of the second lens 18 faces the second surface 122 of the first lens 12. The reflective polarizing film 19 is arranged on the first surface 180 of the second lens 18. The reflective polarizing film 19 is configured to reflect linearly polarized light in the P-polarized state from the phase retardation layer 16 toward the phase retardation layer 16 and to transmit linearly polarized light in the S-polarized state from the phase retardation layer 16.

In this way, the second lens 18 can reflect the P-linearly polarized light and transmit the S-linearly polarized light, and finally emit the S-linearly polarized light.

Specifically, the second lens 18 is an optical element made of a light-transmitting material (such as glass, plastic or crystal), and refracts light in the optical path of the lens assembly 10 mainly by virtue of the refraction of light.

The reflective polarizing film 19 can selectively transmit light. The reflective polarizing film 19 has a transmission axis, light with a polarization direction parallel to the direction of the transmission axis can pass through the reflective polarizing film 19, and light with a polarization direction perpendicular to the direction of the transmission axis can be reflected by the reflective polarizing film 19. In one implementation, the reflective polarizing film 19 is configured to transmit the S-linearly polarized light and reflect the P-linearly polarized light, the polarization direction of the P-linearly polarized light being perpendicular to that of the S-linearly polarized light. That is, the polarization direction of the S-linearly polarized light is parallel to the direction of the transmission axis of the reflective polarizing film 19, and the polarization direction of the P-linearly polarized light is perpendicular to a transmission direction of the reflective polarizing film 19.

The lens assembly 10 further includes the second lens 18 and the reflective polarizing film 19. The second lens 18 includes the first surface 180 and the opposite second surface 182. The first surface 180 of the second lens 18 faces the second surface 122 of the first lens 12. The reflective polarizing film 19 is arranged on the first surface 180 of the second lens 18. The reflective polarizing film 19 is configured to reflect the P-linearly polarized light from the phase retardation layer 16 toward the phase retardation layer 16. The P-linearly polarized light passes through the phase retardation layer 16, and is then converted back into the right circularly polarized light. The right circularly polarized light is reflected by the beam splitter and is converted into the left circularly polarized light. The left polarized light passes through the phase retardation layer 16 for the third time and is converted into the S-linearly polarized light. Finally, the S-linearly polarized light from the phase retardation layer 16 is transmitted by the reflective polarizing film 19.

In summary, the lens assembly 10 includes the first lens 12 and the second lens 18, wherein the first lens 12 includes the first surface 120 and the opposite second surface 122, the second lens 18 includes the first surface 180 and the opposite second surface 182, the second lens 18 is arranged at a side where the second surface 122 of the first lens 12 is located, the semi-transmissive and semi-reflective film 14 is arranged on the first surface 120 of the first lens 12, the phase retardation layer 16 is arranged on the second surface 122 of the first lens 12, and the reflective polarizing film 19 is arranged on the first surface 180 of the second lens 18. The light source emits the circularly polarized light, depending on the different incident angles of the circularly polarized light incident on the semi-transmissive and semi-reflective film 14, the angle of the modulation unit 1401 of the modulation film layer 140 is controlled to change the refractive index of the modulation film layer 140, so as to control the difference in refractive index between the medium film layer 142 and the modulation film layer 140, such that the light splitting characteristics for the P-polarized state and the S-polarized state of the circularly polarized light transmitted through the semi-transmissive and semi-reflective film 14 can be finally controlled to allow more uniform light splitting for the P-polarized state and S-polarized state of the circularly polarized light, so as to ensure the degree of circular polarization of the circularly polarized light transmitted through the semi-transmissive and semi-reflective film 14 at different angles, and reduce the generation of the elliptically polarized light, thereby reducing the generation of stray light in the subsequent optical path, and improving the imaging effect.

The display module 100 provided in an implementation of the present application includes a lens assembly 10 of any of the above implementations and a display screen 20, the display screen 20 being configured to emit light to the lens assembly 10.

Specifically, the display screen 20 serves as a light source for emitting light to the lens assembly 10. The display screen 20 may be one of an Organic Light Emitting Diode (OLED) display panel, a silicon-based OLED display panel, a Micro-Organic Light Emitting Diode (Micro-OLED) display panel, a Mini-Light Emitting Diode (Mini-LED) display panel, a liquid crystal display panel, a silicon-based liquid crystal display panel and the like.

In one implementation, the display screen 20 emits linearly polarized light, and the display module 100 may further include a quarter-wave plate arranged at a light exit side of the display screen 20, the quarter-wave plate being capable of converting the linearly polarized light emitted from the display screen 20 into circularly polarized light.

In other implementations, the display screen 20 is configured to emit the circularly polarized light, so there is no need to arrange the quarter-wave plate in front of the display screen 20, which is conducive to simplifying the structure of the display module 100 and reducing the size.

Referring to FIGS. 6 and 7, an electronic device 1000 provided in an implementation of the present application includes a body 200 and a display module 100 of the above implementations, the display module 100 being integrated with the body 200.

In the lens assembly 10, the display module 100, and the electronic device 1000 according to the present application, the modulation film layer 140 and the medium film layer 142 are configured to cooperatively adjust the refractive index of the semi-transmissive and semi-reflective film 14 to allow more uniform light splitting for the P-polarized state and the S-polarized state of the circularly polarized light, so as to allow the circularly polarized light passing through the semi-transmissive and semi-reflective film 14 to remain in the circularly polarized state, and enable a higher degree of circular polarization of the transmitted circularly polarized light, such that the influences of stray light on the subsequent propagation of light in the optical path are reduced, thereby reducing the ghosting and improving the imaging effect.

Specifically, the electronic device 1000 may be a wearable electronic device, including but not limited to a head-mounted display, smart glasses, a smart watch or a smart band, etc.

In the description of this specification, the description with reference to the terms such as "one implementation", "some implementations", "an illustrative implementation", "an example", "a specific example" or "some examples" means that the specific features, structures, materials, or characteristics described with reference to the implementation or example are included in at least one implementation or example of the present application. In this specification, the illustrative expressions of the above terms do not necessarily refer to the same implementation or example. In addition, the specific features, structures, materials or characteristics described may be combined in any one or more implementations or examples in an appropriate manner.

Although the embodiments of the present application have been shown and described above, it should be understood that the above-mentioned embodiments are merely exemplary and should not be construed as limiting the present application. Those of ordinary skill in the art may make changes, modifications, replacements and variations to the above-mentioned implementations within the scope of the present application.

What is claimed is:

1. A lens assembly, comprising:

a first lens, the first lens comprising a first surface and an opposite second surface; and a semi-transmissive and semi-reflective film arranged on the first surface of the first lens, the semi-transmissive and semi-reflective film comprising a modulation film layer and a medium film layer, the modulation film layer being arranged on the first surface of the first lens, the medium film layer being arranged on a side of the modulation film layer away from the first lens, the medium film layer and the modulation film layer being configured to cooperatively adjust a refractive index of the semi-transmissive and semi-reflective film, so as to allow circularly polarized light incident on the semi-transmissive and semi-reflective film at different incident angles to remain as the circularly polarized light after entering the first lens.

2. The lens assembly according to claim 1, wherein the medium film layer and the modulation film layer are configured to control a difference between a refractive index for a P-polarized state and a refractive index for a S-polarized state of the circularly polarized light transmitted and reflected by the semi-transmissive and semi-reflective film, so as to make a difference between the amounts of split light in the P-polarized state and the S-polarized state of the circularly polarized light entering the semi-transmissive and semi-reflective film less than a preset threshold.

3. The lens assembly according to claim 1, wherein the modulation film layer comprises a plurality of columnar modulation units arranged side by side on the first surface of the first lens, a major axis of each of the modulation units inclines at an angle relative to an optical axis of the first lens.

4. The lens assembly according to claim 3, wherein an intersection point between the major axis of the modulation unit and the first surface of the first lens acts as an incident point, there is an included angle between a normal of the first surface of the first lens at the incident point and the major axis of the modulation unit, and the included angle is associated with a radius of curvature of the first lens, an on-axis distance between the incident point and the optical axis of the first lens, a distance between a light source that emits the circularly polarized light and the first surface of the first lens on the optical axis of the first lens, and a maximum length over which the light source is capable of emitting the circularly polarized light in a direction perpendicular to the optical axis of the first lens.

5. The lens assembly according to claim 4, wherein the included angle has a value in a range from 5° to 80°.

6. The lens assembly according to claim 1, wherein at least one of:

the medium film layer has a thickness in a range from 20 nm to 2000 nm; or the modulation film layer has a thickness in a range from 20 nm to 2000 nm.

7. The lens assembly according to claim 1, wherein at least one of:

the medium film layer is made of an oxide material; or the modulation film layer is made of an oxide material or a metal material.

8. The lens assembly according to claim 1, wherein the modulation film layer is made of a metal material, and the modulation film layer has a thickness in a range from 50 nm to 2000 nm.

9. The lens assembly according to claim 1, wherein the lens assembly further comprises a phase retardation film arranged on the second surface of the first lens, the phase retardation film being configured to change a polarized state of light passing through the phase retardation film.

10. The lens assembly according to claim 9, wherein the lens assembly further comprises:

a second lens comprising a first surface and an opposite second surface, the first surface of the second lens facing the second surface of the first lens; and a reflective polarizing film arranged on the first surface of the second lens, the reflective polarizing film being configured to reflect linearly polarized light in a P-polarized state from the phase retardation film toward the phase retardation film and to transmit linearly polarized light in a S-polarized state from the phase retardation film.

11. A display module, comprising:

a lens assembly; and a display screen configured to emit light to the lens assembly, wherein the lens assembly comprises:

a first lens, the first lens comprising a first surface and an opposite second surface; and a semi-transmissive and semi-reflective film arranged on the first surface of the first lens, the semi-transmissive and semi-reflective film comprising a modulation film layer and a medium film layer, the modulation film layer being arranged on the first surface of the first lens, the medium film layer being arranged on a side of the modulation film layer away from the first lens, the medium film layer and the modulation film layer being configured to cooperatively adjust a refractive index of the semi-transmissive and semi-reflective film, so as to allow circularly polarized light incident on the semi-transmissive and semi-reflective film at different incident angles to remain as the circularly polarized light after entering the first lens.

12. The display module according to claim 11, wherein the medium film layer and the modulation film layer are configured to control a difference between a refractive index for a P-polarized state and a refractive index for a S-polarized state of the circularly polarized light transmitted and reflected by the semi-transmissive and semi-reflective film, so as to make a difference between the amounts of split light in the P-polarized state and the S-polarized state of the circularly polarized light entering the semi-transmissive and semi-reflective film less than a preset threshold.

13. The display module according to claim 11, wherein the modulation film layer comprises a plurality of columnar modulation units arranged side by side on the first surface of the first lens, a major axis of each of the modulation units inclines at an angle relative to an optical axis of the first lens.

14. The display module according to claim 13, wherein an intersection point between the major axis of the modulation unit and the first surface of the first lens acts as an incident point, there is an included angle between a normal of the first surface of the first lens at the incident point and the major axis of the modulation unit, and the included angle is associated with a radius of curvature of the first lens, an on-axis distance between the incident point and the optical axis of the first lens, a distance between a light source that emits the circularly polarized light and the first surface of the first lens on the optical axis of the first lens, and a maximum length over which the light source is capable of emitting the circularly polarized light in a direction perpendicular to the optical axis of the first lens.

15. The display module according to claim 14, wherein the included angle has a value in a range from 5° to 80°.

16. The display module according to claim 11, wherein at least one of:

the medium film layer has a thickness in a range from 20 nm to 2000 nm; or the modulation film layer has a thickness in a range from 20 nm to 2000 nm.

17. The display module according to claim 11, wherein at least one of:

the medium film layer is made of an oxide material; or the modulation film layer is made of an oxide material or the modulation film layer is made of a metal material, and the metal material of the modulation film layer has a thickness in a range from 50 nm to 2000 nm.

18. The display module according to claim 11, wherein the display module further comprises a phase retardation film arranged on the second surface of the first lens, the phase retardation film being configured to change a polarized state of light passing through the phase retardation film.

19. The display module according to claim 18, wherein the display module further comprises:

a second lens comprising a first surface and an opposite second surface, the first surface of the second lens facing the second surface of the first lens; and a reflective polarizing film arranged on the first surface of the second lens, the reflective polarizing film being configured to reflect linearly polarized light in a P-polarized state from the phase retardation film toward the phase retardation film and to transmit linearly polarized light in a S-polarized state from the phase retardation film.

20. An electronic device, comprising:

a body; and a display module, the display module being integrated with the body and comprises a lens assembly and a display screen configured to emit light to the lens assembly, wherein the lens assembly comprises:

a first lens, the first lens comprising a first surface and an opposite second surface; and a semi-transmissive and semi-reflective film arranged on the first surface of the first lens, the semi-transmissive and semi-reflective film comprising a modulation film layer and a medium film layer, the modulation film layer being arranged on the first surface of the first lens, the medium film layer being arranged on a side of the modulation film layer away from the first lens, the medium film layer and the modulation film layer being configured to cooperatively adjust a refractive index of the semi-transmissive and semi-reflective film, so as to allow circularly polarized light incident on the semi-transmissive and semi-reflective film at different incident angles to remain as the circularly polarized light after entering the first lens.

* * * * *